US010422169B2

(12) United States Patent
Christenson et al.

(10) Patent No.: US 10,422,169 B2
(45) Date of Patent: Sep. 24, 2019

(54) FLEXIBLE HINGE ASSEMBLY FOR AIRCRAFT INTERIOR COMPONENTS AND THE LIKE

(71) Applicant: B/E Aerospace, Inc., Winston-Salem, NC (US)

(72) Inventors: Justin C. Christenson, Everett, WA (US); Charles F. Forster, Wellington, FL (US)

(73) Assignee: B/E AEROSPACE, INC., Winston-Salem, NC (US)

( * ) Notice: Subject to any disclaimer, the term of this patent is extended or adjusted under 35 U.S.C. 154(b) by 8 days.

(21) Appl. No.: 15/943,765

(22) Filed: Apr. 3, 2018

(65) Prior Publication Data
US 2018/0283065 A1 Oct. 4, 2018

Related U.S. Application Data

(60) Provisional application No. 62/480,814, filed on Apr. 3, 2017.

(51) Int. Cl.
E05D 1/00 (2006.01)
E05D 1/02 (2006.01)
(Continued)

(52) U.S. Cl.
CPC ............. *E05D 1/02* (2013.01); *B32B 3/12* (2013.01); *B32B 3/30* (2013.01); *A47D 5/006* (2013.01);
(Continued)

(58) Field of Classification Search
CPC ....... Y10T 16/525; Y10T 16/548; E05D 1/00; E05D 1/02; E05D 9/005; E05D 7/00; E05D 1/06; E05Y 2800/68; E05Y 2800/344; E05Y 2800/678; E05Y 2900/602; E05Y 2800/43; E05Y 2900/502; E05Y 2900/538;
(Continued)

(56) References Cited

U.S. PATENT DOCUMENTS 3,445,052 A * 5/1969 Lewallen ............... E05D 1/02
16/225
3,731,449 A * 5/1973 Kephart, Jr. ........... E04C 2/205
52/631
(Continued)

FOREIGN PATENT DOCUMENTS

EP 1464784 A1 * 10/2004 ............... E05D 1/02

Primary Examiner — Chuck Y Mah
(74) Attorney, Agent, or Firm — Clements Bernard Walker PLLC

(57) ABSTRACT

A flexible hinge assembly for aircraft interior components and the like, including: a first structural component, wherein the first structural component includes a core material and one or more skin layers coupled to the core material; a second structural component, wherein the second structural component includes a core material and one or more skin layers coupled to the core material; wherein the one or more skin layers of the first structural component and the one or more skin layers of the second structural component are one or more of coupled together and integrally formed; and a flexure disposed between the first structural component and the second structural component, wherein the flexure is formed by the coupled together and/or integrally formed skin layers.

14 Claims, 4 Drawing Sheets

(51) Int. Cl.
    *B32B 3/30*         (2006.01)
    *B32B 3/12*         (2006.01)
    *B64D 11/00*      (2006.01)
    *A47D 5/00*       (2006.01)

(52) U.S. Cl.
    CPC ..... *B32B 2250/44* (2013.01); *B32B 2605/003* (2013.01); *B32B 2605/18* (2013.01); *B64D 11/00* (2013.01); *E05Y 2800/43* (2013.01); *E05Y 2800/68* (2013.01); *E05Y 2900/502* (2013.01); *E05Y 2900/538* (2013.01)

(58) Field of Classification Search
    CPC ........... E05Y 2800/676; B29L 2031/22; B29C 51/00; B29C 65/70; B29C 66/71; B29C 66/712; B29C 65/30; B29K 2105/06; B29K 2105/089; F16C 11/12; B32B 3/12; B32B 3/30; B32B 2250/44; B32B 2605/003; B32B 2605/18; A47D 5/006; B64D 11/00
    See application file for complete search history.

(56) References Cited

U.S. PATENT DOCUMENTS

| | | | | |
|---|---|---|---|---|
| 4,157,413 A * | 6/1979 | Ruhl | ................... | B29C 44/0446 428/159 |
| 4,704,837 A * | 11/1987 | Menchetti | ............... | E04B 2/723 52/273 |
| 4,828,132 A * | 5/1989 | Francis, Jr. | ......... | B65D 11/1853 16/225 |
| 4,885,820 A * | 12/1989 | Erceg | ................. | B29C 65/5021 16/225 |
| 5,115,855 A * | 5/1992 | Lindblom | ................ | A47G 5/00 16/225 |
| 5,851,634 A * | 12/1998 | Andersen | ............... | B01F 3/1214 428/159 |
| 5,945,053 A * | 8/1999 | Hettinga | .................... | E05D 1/02 264/171.13 |
| 6,149,998 A * | 11/2000 | Hettinga | .................... | E05D 1/02 156/308.4 |
| 6,413,348 B2 * | 7/2002 | Stancu | .................... | B29C 49/20 156/245 |
| 7,582,345 B2 | 9/2009 | Priegelmeir et al. | | |
| 8,794,162 B2 * | 8/2014 | Hisata | .................... | B64D 11/00 108/43 |
| 9,248,786 B2 * | 2/2016 | Suzuki | ................... | B60R 13/013 |
| 9,797,439 B2 * | 10/2017 | Masini | ..................... | E05D 1/00 |
| 9,868,473 B2 * | 1/2018 | Ishii | .......................... | B32B 3/30 |
| 2005/0189674 A1 * | 9/2005 | Hochet | ................. | B29C 53/063 264/138 |
| 2014/0007376 A1 * | 1/2014 | Brewer | ..................... | E05D 1/02 16/225 |
| 2014/0335303 A1 * | 11/2014 | Preisler | ..................... | B32B 3/28 428/95 |
| 2015/0040349 A1 * | 2/2015 | Malia | ...................... | A63H 27/02 16/225 |

* cited by examiner

FLEXIBLE HINGE ASSEMBLY FOR AIRCRAFT INTERIOR COMPONENTS AND THE LIKE

CROSS-REFERENCE

The present patent application/patent claims the benefit of priority of U.S. Provisional Patent Application No. 62/480,814, filed on Apr. 3, 2017, and entitled "FLEXIBLE HINGE FOR AIRCRAFT INTERIOR COMPONENTS," the contents of which are incorporated in full by reference herein.

TECHNICAL FIELD

The present disclosure relates generally to a flexible hinge assembly for aircraft interior components and the like. This flexible hinge assembly obviates the need for using a conventional metal hinge or the like between deployable structural components, provides virtually unlimited fatigue life, and may be used for tables, baby changing tables, slab doors, folding doors, stow bins, amenity drawers, headrests, and the like—virtually anywhere a conventional metal hinge or the like is typically used.

BACKGROUND

Metal hinges, such as pivot hinges, barrel hinges, and piano hinges, are commonly used to connect substantially rigid structures requiring angular movement therebetween. Such metal hinges include metal bearing surfaces, require external attachment, and increase part count, all of which are disadvantageous in aircraft interior applications, for example, where long fatigue life, light weight, and simplicity are desirable. Further, in certain applications, internal springs and/or external return mechanisms are required, further reducing fatigue life and adding weight and complexity.

Thus, what is still needed in the art is an improved flexible hinge assembly for aircraft interior components and the like. Although, in general, the idea of using fiberglass or carbon fiber-reinforced hinges is not new, it has never been implemented adequately or in the applications disclosed herein. The flexible hinge assembly of the present disclosure has virtually unlimited fatigue life, is lightweight, is simple, and accommodates components that are collectively required to deform to fit complex contours when stowed and deploy to a substantially flat configuration, for example. The flexible hinge assembly obviates the need for internal springs and/or external return mechanisms. It is easily customizable for various applications aboard aircraft and other means of conveyance.

SUMMARY

In various aspects, embodiments of the inventive concepts disclosed herein are directed to a flexible hinge assembly for aircraft interior components and the like. This flexible hinge assembly obviates the need for using a conventional metal hinge or the like between deployable structural components, provides virtually unlimited fatigue life, and may be used for tables, baby changing tables, slab doors, folding doors, stow bins, amenity drawers, headrests, and the like—virtually anywhere a conventional metal hinge or the like is typically used. The flexible hinge assembly incorporates an integrated fiberglass or carbon fiber-reinforced (or the like) flexure disposed between the structural components. This flexure may be provided in any length and may be designed to provide and/or allow any angle/range of motion between the structural components, which may have the same size and/or thickness or different sizes and/or thicknesses.

In one aspect, embodiments of the inventive concepts disclosed herein are directed to a flexible hinge assembly for aircraft interior components and the like, including: a first structural component, wherein the first structural component includes a core material and one or more skin layers coupled to the core material; a second structural component, wherein the second structural component includes a core material and one or more skin layers coupled to the core material; wherein the one or more skin layers of the first structural component and the one or more skin layers of the second structural component are one or more of coupled together and integrally formed; and a flexure disposed between the first structural component and the second structural component, wherein the flexure is formed by the coupled together and/or integrally formed skin layers. The core material includes one or more of a porous structure and a honeycombed material. The skin layers include one or more of a fiberglass resin material, a carbon-fiber reinforced material, and a polymeric material that provide the skin material with a desired degree of resistance to flexing. The one or more skin layers are coupled to one or more of a top surface and a bottom surface of the core material of both the first structural component and the second structural component. Alternatively, the one or more skin layers are coupled to an interior portion of the core material of one or more of the first structural component and the second structural component. Optionally, the flexure further includes one or more additional layers disposed substantially adjacent to the coupled together and/or integrally formed skin layers and coupled to the core material of both the first structural component and the second structural component. Optionally, the flexure further includes additional core material disposed substantially adjacent to the coupled together and/or integrally formed skin layers and coupled to the core material of both the first structural component and the second structural component, wherein the additional core material is thinner that the core material of both the first structural component and the second structural component. Optionally, the core material of both the first structural component and the second structural component is tapered substantially adjacent to the flexure. Optionally, the first structural component and the second structural component are both associated with one of a table and a door configured to be installed in an aircraft interior.

In another aspect, embodiments of the inventive concepts disclosed herein are directed to an aircraft interior component including a flexible hinge assembly, the flexible hinge assembly including: a first structural component, wherein the first structural component includes a core material and one or more skin layers coupled to the core material; a second structural component, wherein the second structural component includes a core material and one or more skin layers coupled to the core material; wherein the one or more skin layers of the first structural component and the one or more skin layers of the second structural component are one or more of coupled together and integrally formed; and a flexure disposed between the first structural component and the second structural component, wherein the flexure is formed by the coupled together and/or integrally formed skin layers. The core material includes one or more of a porous structure and a honeycombed material. The skin layers include one or more of a fiberglass resin material, a carbon-fiber reinforced material, and a polymeric material that provide the skin material with a desired degree of resistance to flexing. The one or more skin layers are coupled to one or more of a top surface and a bottom surface of the core material of both the first structural component and the second structural component. Alternatively, the one or more skin layers are coupled to an interior portion of the core material of one or more of the first structural component and the second structural component. Optionally, the flexure further includes one or more additional layers disposed substantially adjacent to the coupled together and/or integrally formed skin layers and coupled to the core material of both the first structural component and the second structural component. Optionally, the flexure further includes additional core material disposed substantially adjacent to the coupled together and/or integrally formed skin layers and coupled to the core material of both the first structural component and the second structural component, wherein the additional core material is thinner that the core material of both the first structural component and the second structural component. Optionally, the core material of both the first structural component and the second structural component is tapered substantially adjacent to the flexure. Optionally, the first structural component and the second structural component are both associated with one of a table and a door configured to be installed in an aircraft interior.

Embodiments of the inventive concepts can include one or more or any combination of the above aspects, features, and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

The inventive concepts are described hereinafter with reference to the accompanying drawings in which exemplary embodiments are shown. However, the inventive concepts may be embodied in many different forms and should not be construed as limited to the representative embodiments set forth herein.

Figure 1:
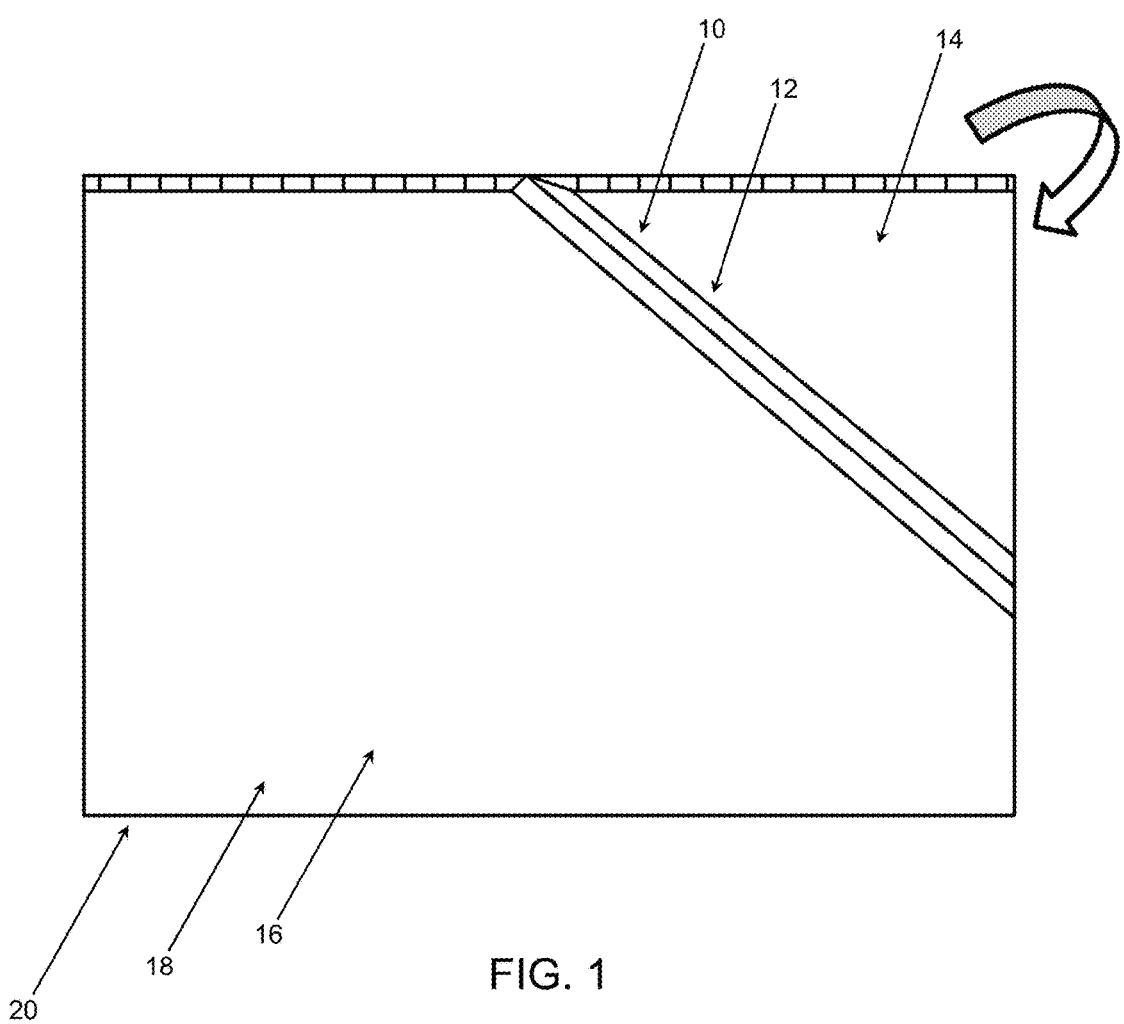
FIG. 1 is a planar view of one exemplary embodiment of the flexible hinge assembly of the present disclosure.

Referring now specifically to FIG. 1, the inventive concepts disclosed herein are generally directed to a flexible hinge assembly 10 including a flexure 12 disposed between and coupled to a first structural component 14 and a second structural component 16. In a preferred embodiment, this flexure 12 is integrally formed with the first structural component 14 and the second structural component 16. In operation, the flexure 12 allows the first structural component 14 and the second structural component 16 to pivot with respect to one another, such that their relative angular orientation is changed. Optionally, as alluded to herein above, the flexure 12 provides an inherent return mechanism, biasing the first structural component 14 and the second structural component 16 to their original collective configuration when not acted upon by an external force, and does so with virtually unlimited fatigue life. In this sense, the flexure 12 provides a spring-loaded hinge 10.

In the exemplary embodiment illustrated, the flexure 12 is incorporated into a baby changing table 18 for use in an aircraft or the like. The first structural component 14 makes up of one portion of the table 18 and the second structural component 16 makes up another portion of the table. Advantageously, the flexure 12 allows the table 18 as a whole to substantially conform to the shape of the fuselage wall when stowed, while allowing the table 18 to lie flat for use when deployed. In this exemplary embodiment, the table is preferably hinged to the fuselage wall using another flexure 20 or a conventional metal hinge or the like. Preferably, either or both of the flexures 12 and 20 have a width that allows an appropriate fastener to be advanced as desired, such as to secure the table 18 to the fuselage wall, etc.

Figure 2:
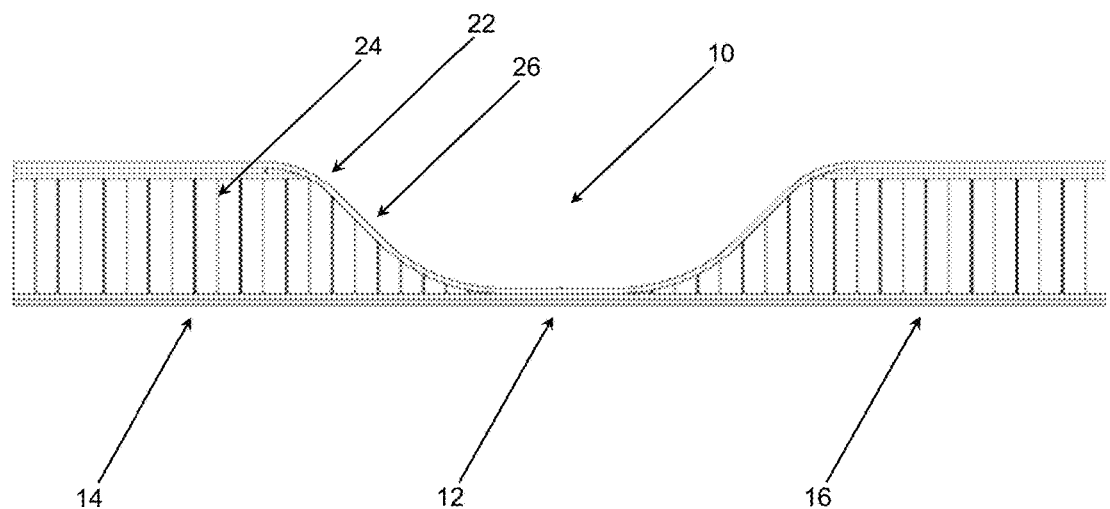
FIG. 2 is a cross-sectional side view of one exemplary embodiment of the flexible hinge assembly of the present disclosure.

Referring now specifically to FIG. 2, the first structural component 14 and the second structural component 16 may each consist of a panel formed from plastic, fiberglass, a carbon fiber-reinforced material or the like consisting of a skin layer 22 and a core material 24. The skin layer 22 forms the exterior surface of the first structural component 14 and the second structural component 16 and is somewhat rigid, but deformable such that it seeks to return to its original configuration when not acted upon by an adequate force. The core material 24 may be solid or define any number and configuration of voids. For example, the core material 24 may have a honeycombed structure. This provides the overall first and second structural components 14 and 16 with overall structural and surface rigidity for the given application. Preferably, the flexure 12 consists of a linear area where the core material 24 is thinned or not present, leaving only the skin layer(s) 22, thereby imparting a degree of resistant flexibility to the flexure 12 under adequate force. Thus, the flexure 12 forms a spring-loaded hinge 10 between the first structural component 14 and the second structural component 16. It will be readily apparent to those of ordinary skill in the art that any suitable lightweight materials may be used for the skin layer 22 and the core material 24, provided that the core material 24 imparts the first structural component 14 and the second structural component 16 with sufficient rigidity and the skin layer 22 provides the flexure 12 with sufficient flexibility (as well as providing the first structural component 14 and the second structural component 16 with an appropriate surface).

In the exemplary embodiment illustrated, the flexure 12 consists of two skin layers 22, the top skin layer 22 and the bottom skin layer 22, with no core material 24 in between. The rigidity of the flexure 12 can be increased by leaving some core material 24 between the top skin layer 22 and the bottom skin layer 22 coincident with the flexure 12, or by adding additional skin layer 22 to the flexure 12. In either case, the core material 24 may include a gradient ramp structure 26 one either side of the flexure 12. This may be used to control precisely where, in what direction, and/or the degree to which the flexure 12 flexes, and act as a shoulder that stops relative pivoting between the first structural component 14 and the second structural component 16 after a desired degree of pivoting has occurred.

In an alternative exemplary embodiment, the flexure 12 can be formed from a hinge layer that simultaneously protrudes from the top, bottom, or interior of the first structural component 14 and the second structural component 16 and bridges the gap formed therebetween. This hinge layer may coincide with and replace one or more of the skin layers 22, or it may be used in addition to one or more of the skin layers 22. In this regard, any number and configuration of layers can be utilized. For example, a rigid exterior and/or protective layer may be applied to any of the skin layer 22. A flexible protective layer may also be applied over the flexure 12.

In the exemplary embodiment illustrated, top skin layer 22 forms the top of the first structural component 14, the second structural component 16, and the flexure 12. The bottom skin layer 22 forms the bottom of the first structural component 14, the second structural component 16, and the flexure 12. Again, it will readily apparent to those of ordinary skill in the art that intervening and/or additional layers, consisting of the same or different materials, could also be utilized. Optionally, the flexure 12 consists of a thinned space between the first structural component 14 and the second structural component 16. Alternatively, the flexure 12 could simply consist of a thinned point between the first structural component 14 and the second structural component 16. This thinned space or point is spanned by one or more of the skin layers 22 and/or another layer coupled to or integrally formed with a forming a portion of the first structural component 14 and the second structural component 16.

It should be noted that, although the first structural component 14 is illustrated as being a first table panel and the second structural component 16 is illustrated as being a second table panel, one of the first structural component 14 and the second structural component 16 could also be a portion of a wall or the like, or merely a thickened attachment structure by which the flexure 12 is attached to a portion of a wall or the like.

Again, in various aspects, embodiments of the inventive concepts disclosed herein provide a flexible hinge assembly 10 for aircraft interior components and the like. This flexible hinge assembly 10 obviates the need for using a conventional metal hinge or the like between deployable structural components 14 and 16, provides virtually unlimited fatigue life, and may be used for tables, baby changing tables 18, slab doors, folding doors, stow bins, amenity drawers, headrests, and the like—virtually anywhere a conventional metal hinge or the like is typically used. The flexible hinge assembly 10 incorporates an integrated fiberglass or carbon fiber-reinforced (or the like) flexure 12 disposed between the structural components 14 and 16. This flexure 12 may be provided in any length and may be designed to provide and/or allow any angle/range of motion between the structural components 14 and 16, which may have the same size and/or thickness or different sizes and/or thicknesses. The advantage of using a fiberglass resin or the like for the flexure 12 is that it is lightweight, has virtually unlimited fatigue lift, and provides a desirable spring force for a returnable hinge.

Figure 3:
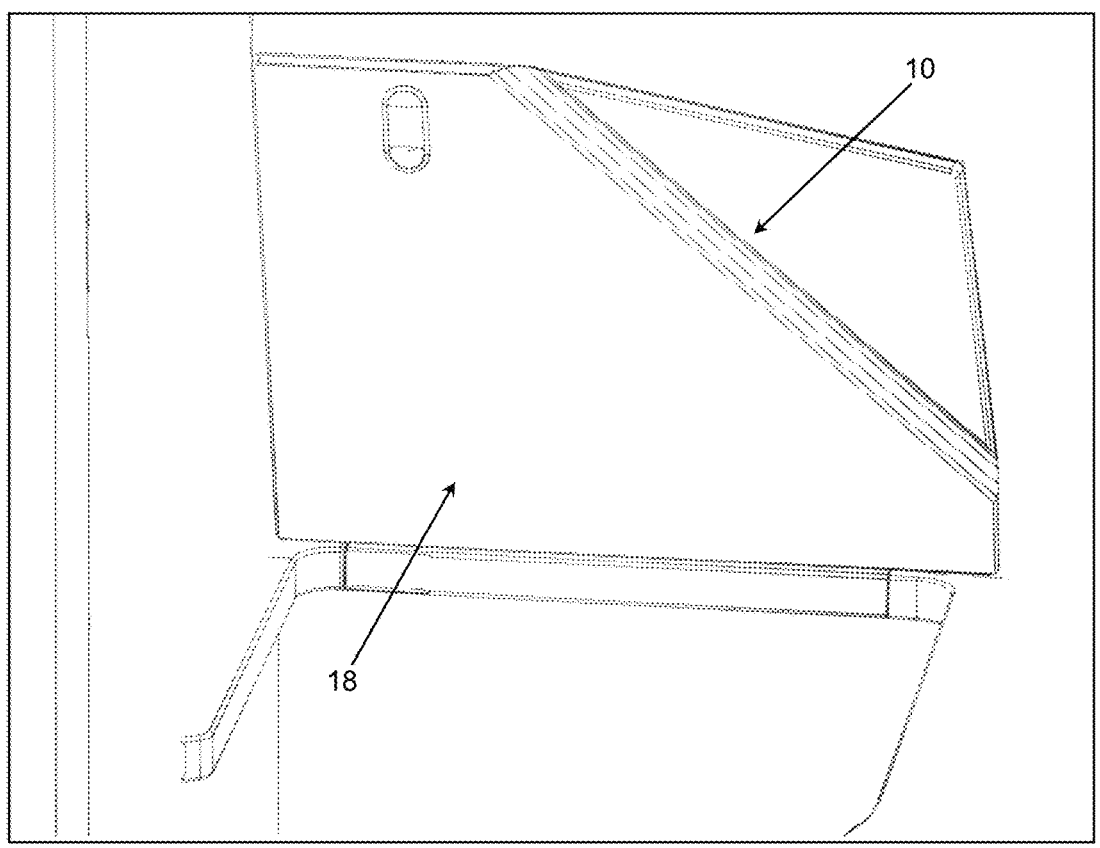
FIG. 3 is a perspective view of one exemplary embodiment of a baby changing table incorporating the flexible hinge assembly of the present disclosure in a stowed configuration, substantially conforming to the adjacent interior wall of an aircraft in which the baby changing table is disposed.

FIG. 3 is a perspective view of one exemplary embodiment of the baby changing table 18 incorporating the flexible hinge assembly 10 of the present disclosure in a stowed configuration, substantially conforming to the adjacent interior wall of an aircraft in which the baby changing table 18 is disposed.

Figure 4:
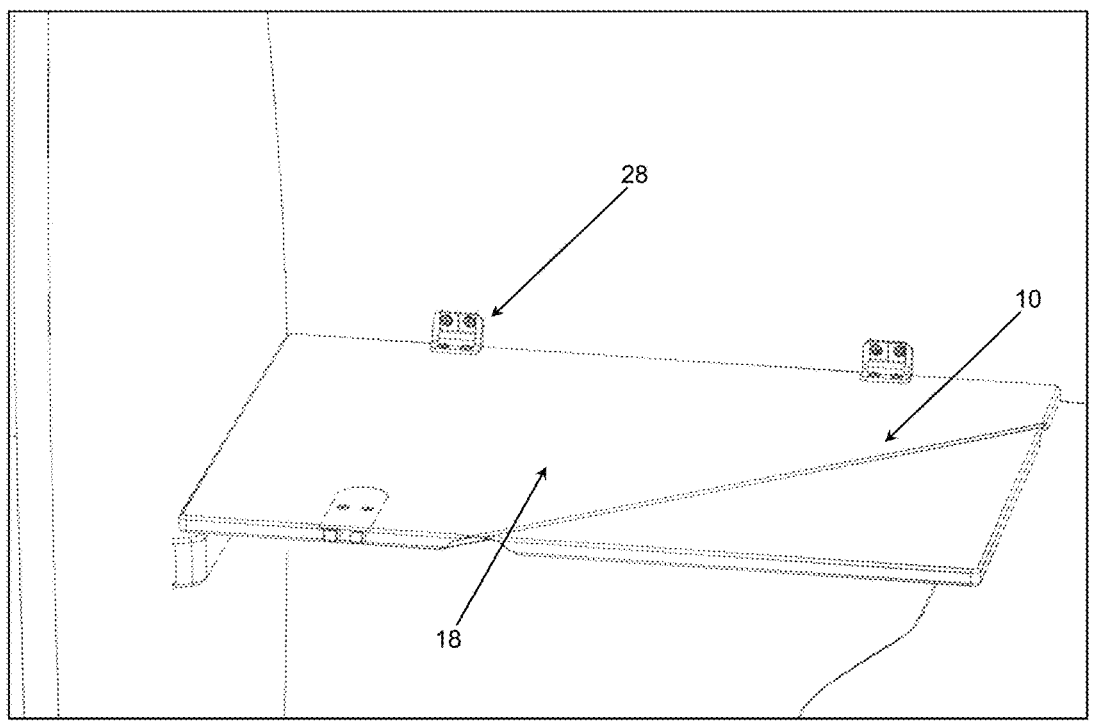
FIG. 4 is another perspective view of one exemplary embodiment of a baby changing table incorporating the flexible hinge assembly of the present disclosure in a deployed, substantially flat configuration.

FIG. 4 is another perspective view of one exemplary embodiment of the baby changing table 18 incorporating the flexible hinge assembly 10 of the present disclosure in a deployed, substantially flat configuration. In this view, conventional metal hinges or the like 28 are depicted coupling the baby changing table 18 to the interior wall of the aircraft.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. A hinging table assembly for mounting to an aircraft fuselage wall, the hinging table assembly comprising:
a first panel;
a second panel for connection to a fuselage wall; and
a flexure hingedly connecting the first panel to the second panel,
wherein the first panel comprises a first core material and a first portion of a first skin layer coupled to the first core material;
wherein the second panel comprises a second core material and a second portion of the first skin layer coupled to the second core material;
wherein the flexure is defined by a third portion of the first skin layer hingedly connecting the first portion and second portion thereof, and
wherein the hinging table assembly has a deployed position, in which the first panel and second panel lie flat, and a stowed position conforming to a fuselage wall by hinging of the flexure.

2. The hinging table assembly of claim 1, wherein the first core material comprises one or more of a porous structure and a honeycombed material, and the second core material comprises one or more of a porous structure and a honeycombed material.

3. The hinging table assembly of claim 1, wherein the first skin layer comprises one or more of a fiberglass resin material, a carbon-fiber reinforced material, and a polymeric material that provide resistance to flexing.

4. The hinging table assembly of claim 1, further comprising a second skin layer, wherein the first skin layer is attached to a first side of the first core material and a first side of the second core material, and wherein the second skin layer is attached to a second side of the first core material and a second side of the second core material.

5. The hinging table assembly of claim 4, wherein, the first skin layer defines a planar top surface of the hinging table assembly in the deployed position of the hinging table assembly, and wherein the first skin layer faces and conforms to the fuselage wall in the stowed position.

6. The hinging table assembly of claim 1, wherein the first core material and the second core material are both tapered substantially adjacent to the flexure.

7. The hinging table assembly of claim 1, wherein the first panel and the second panel are both associated with a door configured to be installed in an aircraft interior.

8. An aircraft interior component comprising a flexible hinge assembly, the flexible hinge assembly comprising:
a first panel;
a second panel for connection to a fuselage wall; and
a flexure hingedly connecting the first panel to the second panel, wherein the first panel comprises a first core material and a first portion of at least one skin layer coupled to the first core material;

wherein the second panel comprises a second core material and a second portion of the at least one skin layer coupled to the second core material;

wherein the flexure is defined by a third portion of the at least first skin layer hingedly connecting the first portion and second portion thereof, and wherein the hinging table assembly has a deployed position, in which the first panel and second panel lie flat, and a stowed position conforming to a fuselage wall by hinging of the flexure.

9. The aircraft interior component of claim 8, wherein the first core material comprises one or more of a porous structure and a honeycombed material, and the second core material comprises one or more of a porous structure and a honeycombed material.

10. The aircraft interior component of claim 8, wherein the first skin layer comprises one or more of a fiberglass resin material, a carbon-fiber reinforced material, and a polymeric material that provide the skin material with a degree of resistance to flexing.

11. The aircraft interior component of claim 8, further comprising a second skin layer, wherein the first skin layer is attached to a first side of the first core material and a first side of the second core material, and wherein the second skin layer is attached to a second side of the first core material and a second side of the second core material.

12. The aircraft interior component of claim 11, wherein, the first skin layer is a planar top surface of the hinging table assembly in the deployed position of the hinging table assembly, and wherein the first skin layer faces and conforms the fuselage wall in the stowed position.

13. The aircraft interior component of claim 8, wherein the first core material and the second core material are both is tapered substantially adjacent to the flexure.

14. The aircraft interior component of claim 8, wherein the first structural component and the second structural component are both associated with one of a table and a door configured to be installed in an aircraft interior.

* * * * *